United States Patent [19]

Watanabe

[11] Patent Number: 5,802,049
[45] Date of Patent: Sep. 1, 1998

[54] METHOD OF SELECTING ROUTE IN CELL SWITCH

[75] Inventor: Yoshihiro Watanabe, Kawasaki, Japan

[73] Assignee: Fujitsu Limited, Kanagawa, Japan

[21] Appl. No.: 658,155

[22] Filed: Jun. 4, 1996

[30] Foreign Application Priority Data

Aug. 14, 1995 [JP] Japan .................. 7-206951

[51] Int. Cl.$^6$ .................................. H04L 12/56
[52] U.S. Cl. .................. 370/390; 370/388; 370/395
[58] Field of Search .................. 370/351, 352, 370/388, 389, 390, 392, 395, 399, 400, 409, 412, 413, 415, 417, 230–232; 340/825, 825.01, 825.03, 826

[56] References Cited

U.S. PATENT DOCUMENTS

| | | | |
|---|---|---|---|
| 5,202,885 | 4/1993 | Schrodi et al. | 370/390 |
| 5,276,425 | 1/1994 | Swanson et al. | 370/390 |
| 5,392,280 | 2/1995 | Zheng | 370/353 |
| 5,506,840 | 4/1996 | Pauwels et al. | 370/397 |
| 5,577,032 | 11/1996 | Sone et al. | 370/390 |
| 5,577,035 | 11/1996 | Hayter et al. | 370/395 |
| 5,689,506 | 11/1997 | Chiussi et al. | 370/388 |

*Primary Examiner*—Benedict V. Safourek
*Assistant Examiner*—Seema S. Rao
*Attorney, Agent, or Firm*—Helfgott & Karas, PC.

[57] ABSTRACT

A route is selected such that a cell pass through the SRM at the second stage that has the smallest free band when the call requested by the subscriber is to be processed for the point-to-point connection, thereby exercising control such that routes having larger band are reserved. A route is selected such that a cell pass through the SRM at the second stage that has the largest free band when the call requested by the subscriber is to be processed for the multicasting connection, thereby exercising control to avoid contentions between the route selected for the multicasting connection and the route selected for the point-to-point connection.

7 Claims, 4 Drawing Sheets

| TOTAL FREE BAND IN EACH LINE IN SW AT SECOND STAGE | | FREE BAND IN EACH HW IN EACH LINE | |
|---|---|---|---|
| | | ⋮ | |
| LINE 1 | 3000 Mbps | i | 1000 Mbps |
| | | ⋮ | |
| ⋮ | | ⋮ | |
| LINE j | | ⋮ | |
| | | | |

TOTAL FREE BAND IN EACH LINE = ∑ FREE BAND IN HW ACCOMODATED BY CORRESPONDING LINE

FIG. 3

| THE MINIMUM VALUE OF FREE BAND IN EACH LINE IN SW AT SECOND STAGE | | FREE BAND IN EACH HW IN EACH LINE | |
|---|---|---|---|
| LINE 1 | 1010 Mbps | 1 | 1010 Mbps |
| | | 2 | 1020 Mbps |
| | | 3 | 1030 Mbps |
| | | ⋮ | |
| ⋮ | | ⋮ | |
| LINE j | | ⋮ | |
| | | | |

TOTAL FREE BAND IN EACH LINE = Min (FREE BAND IN HW ACCOMODATED BY CORRESPONDING LINE)

FIG. 4

METHOD OF SELECTING ROUTE IN CELL SWITCH

BACKGROUND OF THE INVENTION

1. Field of the Invention

The present invention relates to a route selecting method for realizing a multicasting connection in a cell switch such as an asynchronous transfer mode (ATM) switch that is provided with a plurality of routes between an input and output highways and has the function of copying cells to the routing module in each switch.

2. Description of the Related Art

An ATM switching technology is accepted by the ITU-T (International Telecommunication Union-Telecommunication Standardization Sector) as an effective switching system for future use, and has been studied widely by various organizations to realize an integrated service digital network. With the ATM switch, user information is transmitted with the contents (data, voice, images, etc.) of the information put in fixed-length packets called cells, and the cells are switched by a hardware switch, thereby transferring the information at a high speed.

Based on the above described background, a multicasting service has been suggested. With this service, a plurality of subscribers (leaves) can be provided with the same information by copying the cell from the information source (root) for the number of subscribers. Therefore, the multicasting service requires the function of copying cells from the root for any number of leaves, and also requires studying the band management and route selecting system for the above described multicasting connection.

Algorithms such as a packing system, a uniform system, an allotter system, etc. have been suggested as route selecting systems for the point-to-point connection by the ATM switch. The packing system selects a link having the smallest sum of bands required at each stage. According to the system, control works such that a link having a larger available band may be reserved. Therefore, when a request for a connection is issued and requires a large request band, it can be easily made. The uniform system equally allots bands to each link. The allotter system unconditionally selects a link in a specified order.

When a route is selected in a multicasting connection or a point-to-multipoint connection where paths are simultaneously set from a highway to a plurality of highways, a lost-call rate should be taken into account in the multicasting connection. That is, when a path is to be set from a root to a plurality of leaves, a route should be selected so that all leaves can be connected. Specifically when a leaf is added in the properly-established multicasting connection, the lost-call rate should be reduced to the smallest possible value.

However, no practical route-selection algorithm has been developed yet for use in the multicasting connection.

SUMMARY OF THE INVENTION

The present invention aims at selecting a route for a point-to-multipoint connection (multicasting connection) that rarely gets in contention with routes for the point-to-point connection.

The present invention relates to a route selecting method realized in a cell switch such as an ATM switch that is provided with a plurality of routes between an input and output highways and has the function of copying cells to the routing module in each switch.

For the route selecting method, a route having the smallest free band is first selected for a point-to-point connection.

Then, a route having the largest free band is selected for the point-to-multipoint connection (multicasting connection).

When a free band is determined for a routing module in an intermediate stage between the first and last stages in determining the above described free band with the above described configuration, the sum of the free bands of the output paths in the routing module at the intermediate stage can be determined to be a free band for the routing module at the intermediate stage.

Of the free bands of the output paths in the routing module at the intermediate stage, the smallest value can be determined to be the free band for the routing module at the intermediate stage.

In the point-to-point connection, a route is selected such that the cells relating to the connection can pass through the routing module having the smallest free band. As a result, a route having a larger free band can be reserved. In the point-to-multipoint connection (multicasting connection), a route is selected such that the cells relating to the connection can pass through the routing module having the largest free band. As a result, control is made to avoid contentions between the route selected for the point-to-multipoint connection and the route selected for the point-to-point connection.

A new subscriber may be added to an established point-to-multipoint connection, but the new subscriber may not be contained in the routing module at the last stage containing subscribers already connected to the point-to-multipoint connection. Furthermore, a route to the routing module at the last stage, in which the newly added subscriber is accommodated, may be additionally selected at the intermediate stage for the point-to-multipoint connection. Under such circumstances, the present invention can successfully select the routes with high probability, and reduce the lost-call rate when new subscribers are added for the point-to-multipoint connection.

Furthermore, a new route can be successfully added or selected with high probability on an average even if any route is added or selected in the routing module at any intermediate stage when a leaf is added in the multicasting connection because, according to the present invention, the sum of the free bands in the output paths in the routing module at the intermediate stage can be determined as the free band of the routing module at the intermediate stage.

Additionally, the times of operations can be minimized in determining the free band and a new route can be successfully added or selected with high probability in the routing module at the intermediate stage when a new subscriber is added for the point-to-multipoint connection because, according to the present invention, the smallest of the free bands in the output paths in the routing module at the intermediate stage can be determined as the free band of the routing module at the intermediate stage.

BRIEF DESCRIPTION OF THE DRAWINGS

FIG. 3 shows the configuration (1) of the free band management table according to the embodiment of the present invention; and FIG. 4 shows the configuration (2) of the free band management table according to the embodiment of the present invention.

DESCRIPTION OF THE PREFERRED EMBODIMENTS

Figure 1:
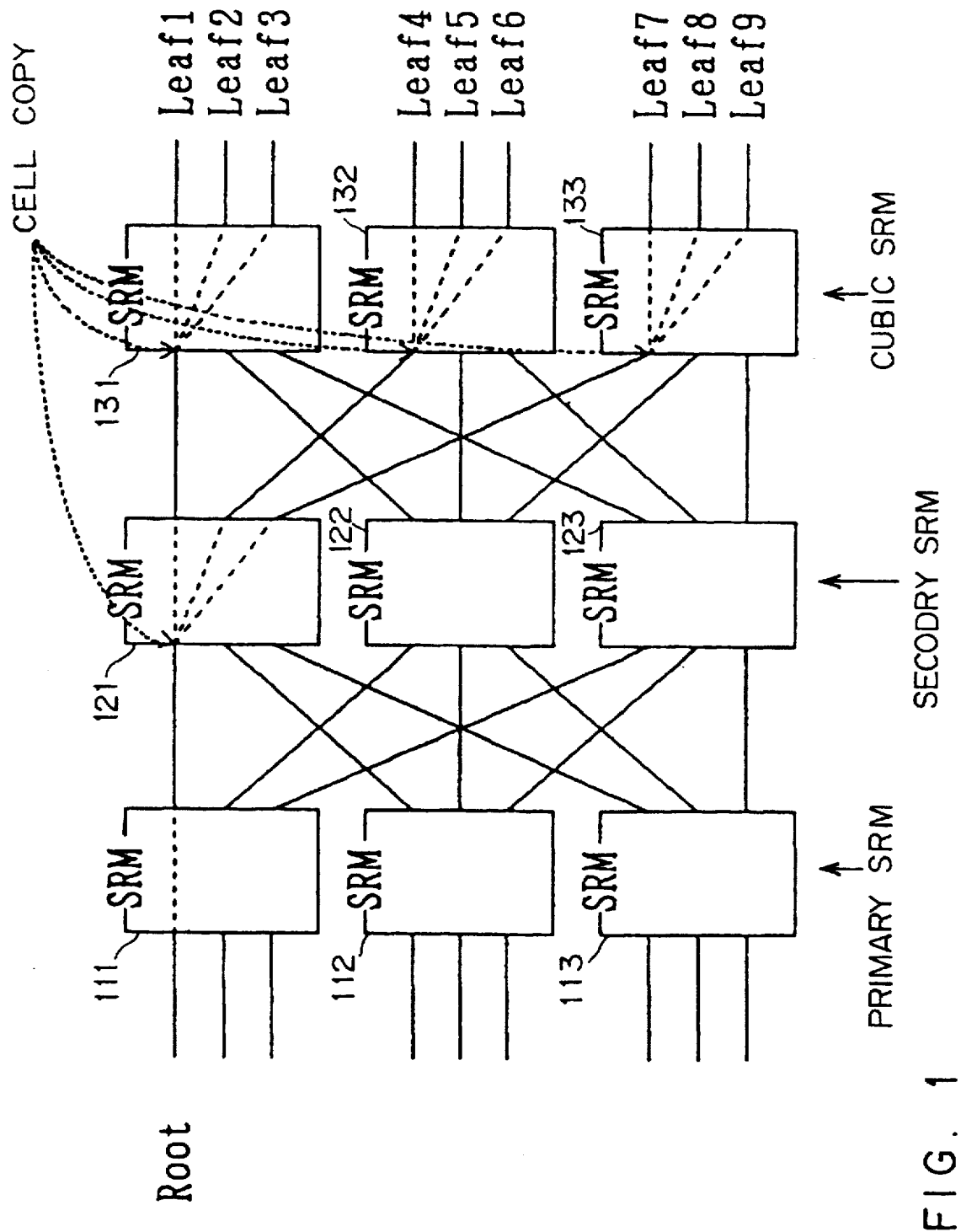
FIG. 1 shows the configuration of the switch to which the present invention is applied.

The embodiments of the present invention are described below in detail by referring to the drawings.

FIG. 1 shows the configuration of the switch to which the present invention is applied.

The switch is designed such that the self-routing module (SRM) has a configuration of 3 stages×3 rows to switch an input cell through the hardware according to the tag information added to the input cell. Hereinafter, the SRMs 111 through 113 at the first stage are referred to as primary SRMs 111 through 113, the SRMs 121 through 123 at the second stage are referred to as secondary SRMs 121 through 123, and the SRMs 131 through 133 at the third stage are referred to as cubic SRMs 131 through 133.

The secondary SRMs 121 through 123 and cubic SRMs 131 through 133 can make copies from an input cell to a plurality of cells to be transmitted to a plurality of output paths. To prevent the plurality of cells copied from the single cell in a single root from being output finally to the same leaf, the primary SRMs 111 through 113 normally does not have the function of copying a cell.

As described above, tag information is added to a cell to be input to the switch designed as shown in FIG. 1. Thus, the cell is autonomously switched in the switch. The switch processor (not shown in the drawings) sets tag information in a tag information assigning unit (not shown in the drawings) provided at the entry point of the switch so that a route can be selected for a cell from each subscriber. Address information comprising a virtual path identifier (VPI) and a virtual channel identifier (VCI) added to the header of each cell identifies a cell and tag information to be added to the cell. That is, the switch processor sets the tag information for the tag information assigning unit for each VPI/VCI. The tag information assigning unit determines the VPI/VCI of an input cell to assign the tag information corresponding to the cell and output the cell to the switch.

In the operation of the basic ATM switch, the routes are selected for the point-to-point connection and multicasting connection (point-to-multipoint connection) as follows.

Basically, a route is selected such that a cell passes through the secondary SRMs 121 through 123 having the smallest possible free band for the point-to-point connection. As a result, control is exercised such that routes having larger free bands are reserved. On the other hand, a route is selected such that a cell passes through one of the secondary SRMs 121 through 123 having the largest possible free band in the multicasting connection. As a result, control is made to avoid contentions between the route selected for the point-to-multipoint connection and the route selected for the point-to-point connection. This is the most outstanding feature of the present invention.

Figure 2:
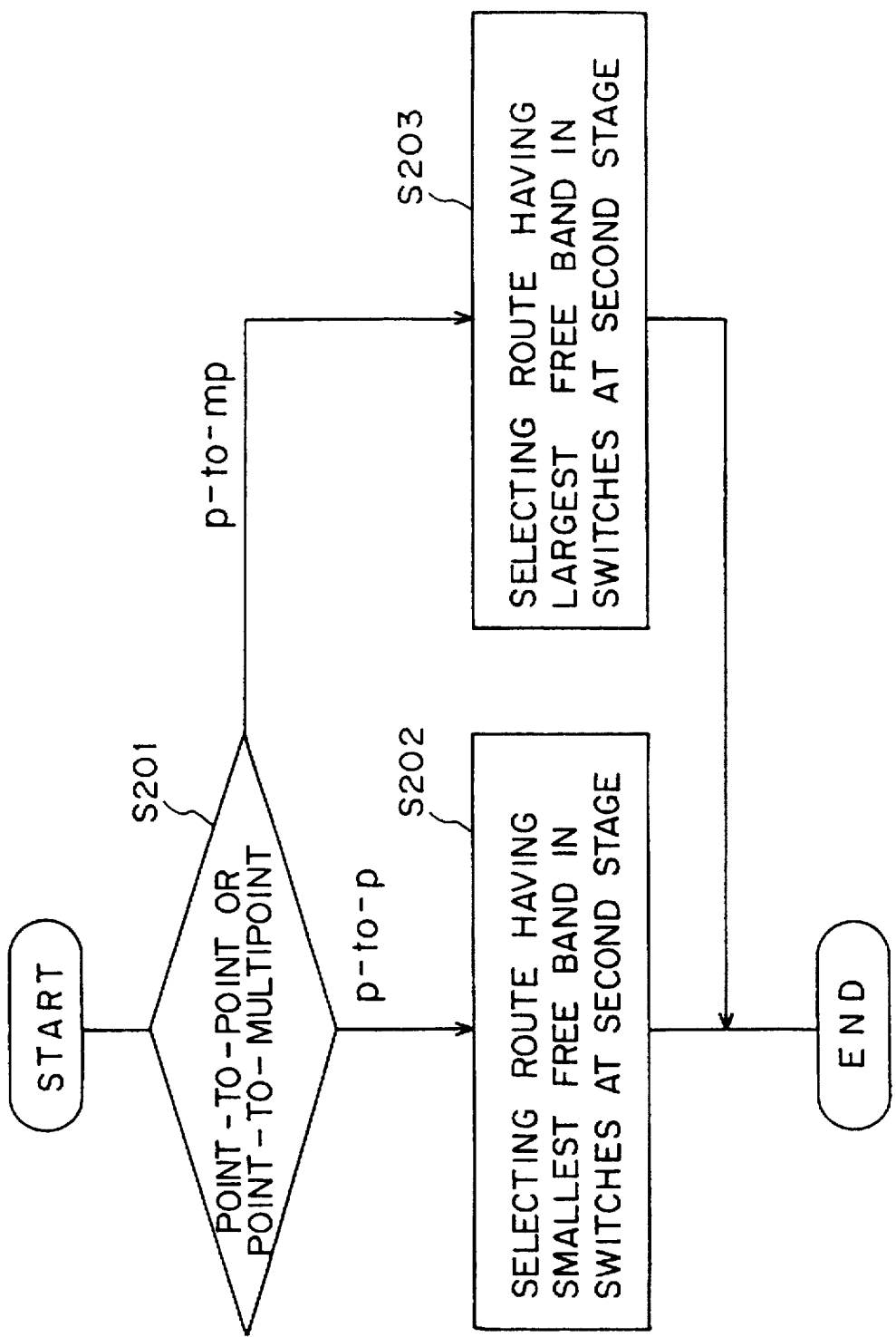
FIG. 2 is an operating flowchart showing the operations according to the embodiment of the present invention.

FIG. 2 is an operating flowchart for the route selecting operation performed by the switch processor (not shown in the drawings) for controlling the switch configured as shown in FIG. 1. The operation on the flowchart is activated when any subscriber issues a call.

In step S201, it is determined whether a call requested by the subscriber is to be processed for the point-to-point connection or multicasting connection (point-to-multipoint connection).

If it is determined that the call requested by the subscriber in step S201 is to be processed for the point-to-point connection, then a route is selected in step S202 such that a cell passes through one of the secondary SRMs 121 through 123 at the second stage that has the smallest free band. As a result, control is exercised such that routes having larger free bands are reserved.

If it is determined that the call requested by the subscriber in step S201 is to be processed in the multicasting connection, then a route is selected in step S203 such that a cell passes through one of the secondary SRMs 121 through 123 at the second stage that has the largest free band. As a result, control is made to avoid contentions between the route selected for the point-to-multipoint connection and the route selected for the point-to-point connection.

After selecting the route, the central processing unit (not shown in the drawings) sets in the tag information assigning unit (not shown in the drawings) provided at the entry point of the switch the tag information corresponding to the selected route based on the VPI/VCI determined for the subscriber related to the call.

In this case, if a leaf is added in the already established multicasting connection, and if it is included in the cubic SRMs 131 through 133 containing the leaves in the multicasting connection, then the switch processor additionally sets the tag information that the cell is to be copied to the added leaf in the cubic SRMs 131 through 133. If the leaf is not included in the cubic SRMs 131 through 133 containing the leaves in the multicasting connection, then the switch processor additionally sets in the secondary SRMs 121 through 123 related to the multicasting connection the tag information that the cell is to be copied to the cubic SRMs 131 through 133 containing the added leaf. In step S203 shown in FIG. 2, when the multicasting connection is started, the switch processor preliminarily selects a route that allows the cell to pass through one of the secondary SRMs 121 through 123 having the largest free band. Thus, when a route is selected for new cubic SRMs 131 through 133, the probability of successfully selecting the route can be enhanced, thereby reducing the lost-call rate when a leaf is added in the multicast connection.

FIG. 3 is a diagram showing the configuration of the free band management table (1) used when the free bands of the secondary SRMs 121 through 123 at the second stage are calculated in step S202 and S203 in performing the route selecting operation by the switch processor according to the operating flowchart shown in FIG. 2. The table is stored in the memory in the switch processor.

As shown in FIG. 3, the free band management table stores a free band for each output highway of each of the secondary SRMs 121 through 123 corresponding to each of the 3-row secondary SRMs 121 through 123 shown in FIG. 1. It also stores a total of the free bands of the secondary SRMs 121 through 123 as the free band of each of the secondary SRMs 121 through 123. The contents of the table are updated each time the switch processor issues or disconnects a call.

The switch processor determines the free bands of the secondary SRMs 121 through 123 in steps S202 and S203 shown in FIG. 2 using the free band management table shown in FIG. 3. Thus, the selection can be successfully performed at an enhanced probability on an average even if any route is newly added or selected in the secondary SRMs 121 through 123 when a leaf is added in the multicasting connection.

FIG. 4 shows the configuration of the free band management table (2) used by the switch processor.

As shown in FIG. 4, the free band management table stores a free band for each output highway of each of the secondary SRMs 121 through 123 corresponding to each of the 3-row secondary SRMs 121 through 123 shown in FIG. 1. It also stores the minimum value as the free band of each of the secondary SRMs 121 through 123.

By determining the free bands of the secondary SRMs 121 through 123 in steps S202 and S203 shown in FIG. 2 using the free band management table shown in FIG. 4, the switch processor can successfully add or select a new route in the secondary SRMs 121 through 123 with enhanced probability in adding a leaf in the multicasting connection with the times of operations minimized. If the maximum value of the free band for each output highway of each of the secondary SRMs 121 through 123 is used as the free band of each of the secondary SRMs 121 through 123, then it is determined that the free band of the secondary SRMs 121 through 123 is large even if there is only one unused highway in each of the secondary SRMs 121 through 123. Thus, it is probably used for the multicasting connection. Therefore, the assumption is not acceptable, but the minimum value of the free band for the output highway of each of the secondary SRMs 121 through 123 should be used as the free band of each of the secondary SRMs 121 through 123.

The present invention is applied to the ATM switch in the above described embodiments. If the switch has the function of switching cells, then the present invention can be applicable to other cell switching systems.

According to the present invention, control is made to avoid contentions between the route selected for the point-to-multipoint connection and the route selected for the point-to-point connection.

A new subscriber may be added to an established point-to-multipoint connection, but the new subscriber may not be contained in the routing module at the last stage containing subscribers already connected to the point-to-multipoint connection. Furthermore, a route to the routing module at the last stage, in which the newly added subscriber is accommodated, may be additionally selected at the intermediate stage for the point-to-multipoint connection. Under such circumstances, the present invention can successfully select the routes with high probability, and reduce the lost-call rate when new subscribers are added for the point-to-multipoint connection.

Furthermore, a new route can be successfully added or selected with high probability even if any route is added or selected in the routing module at any intermediate stage when a leaf is added in the multicasting connection because, according to the present invention, the sum of the free bands in the output paths in the routing module at the intermediate stage can be defined as the free band of the routing module at the intermediate stage.

Additionally, the times of operations can be minimized in determining the free band and a new route can be successfully added or selected with high probability in the routing module at the intermediate stage when a new subscriber is added for the point-to-multipoint connection because, according to the present invention, the smallest of the free bands in the output paths in the routing module at the intermediate stage can be defined as the free band of the routing module at the intermediate stage.

What is claimed is:

1. A route selecting method for use in a cell switch provided with a plurality of routes between an input highway and an output highway and capable of copying a cell in a routing module in the cell switch, comprising the steps of:

selecting a route having a smallest free band for a point-to-point connection; and selecting a route having a largest free band for a point-to-multipoint connection.

2. The route selecting method according to claim 1, further comprising the step of:

determining whether a path in the input highway or output highway is processed for a point-to-point connection or for a point-to-multipoint connection.

3. The route selecting method according to claim 1, wherein a sum of free bands in each output path in the routing module at an intermediate stage between a first stage and a last stage is determined to be the free band of the routing module of the intermediate stage.

4. The route selecting method according to claim 1, wherein a smallest free band in each output path in the routing module at an intermediate stage between a first stage and a last stage is determined to be the free band of the routing module of the intermediate stage.

5. A cell switch, provided with a plurality of routes between an input highway and an output highway, for copying a cell in a routing module in the cell switch, comprising:

determining means for determining whether a path in the input highway or output highway is processed for a point-to-point connection or for a point-to-multipoint connection;

detecting means for detecting a free band in the routing module;

selecting means for selecting a smallest free band for the point-to-point connection and a largest free band for the point-to-multipoint connection.

6. A route selecting apparatus for use in a cell switch provided with a plurality of routes between an input highway and an output highway and capable of copying a cell in a routing module in the cell switch, comprising:

first selecting means for selecting a route having a smallest free band for a point-to-point connection; and second selecting means for selecting a route having a largest free band for a point-to-multipoint connection.

7. The route selecting apparatus according to claim 6, wherein the cell switch is a network for communication with a fixed length cell including a header field of routing information and an information field of data.

* * * * *